(12) United States Patent  
Chung et al.

(10) Patent No.: US 8,185,393 B2  
(45) Date of Patent: May 22, 2012

(54) HUMAN SPEECH RECOGNITION APPARATUS AND METHOD

(75) Inventors: Hoon Chung, Gangwon-do (KR); Yunkeun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 761 days.

(21) Appl. No.: 12/334,032

(22) Filed: Dec. 12, 2008

(65) Prior Publication Data

US 2009/0157403 A1    Jun. 18, 2009

(30) Foreign Application Priority Data

Dec. 14, 2007 (KR) .................. 10-2007-0130950

(51) Int. Cl.  
*G10L 15/10* (2006.01)

(52) U.S. Cl. ......................................... 704/254

(58) Field of Classification Search ............... 704/254  
See application file for complete search history.

(56) References Cited

U.S. PATENT DOCUMENTS 5,195,167 A * 3/1993 Bahl et al. .................. 704/200  
5,315,689 A * 5/1994 Kanazawa et al. .......... 704/238  
7,181,391 B1 * 2/2007 Jia et al. ..................... 704/231  
7,676,365 B2 * 3/2010 Hwang et al. ............... 704/240  
8,015,016 B2 * 9/2011 Park et al. ................... 704/277

FOREIGN PATENT DOCUMENTS

KR    10-2006-0058004    5/2006

OTHER PUBLICATIONS

Manhung Siu, et al., "Variable N-Grams and Extensions for Conversational Speech Language Modeling", *IEEE Transactions on Speech and Audio Processing*, vol. 8, No. 1, Jan. 2000, pp. 63-75.  
Korean Office Action dated Jul. 23, 2009 and issued in corresponding Korean Patent Application 10-2007-0130950.  
Kris Demuynck, et al., "FLaVoR: A Flexible Architecture for LVCSR", In Proceedings of Eurospeech, pp. 1973-1976, 2003.

* cited by examiner

*Primary Examiner* — Susan McFadden  
(74) *Attorney, Agent, or Firm* — Staas & Halsey LLP (57) ABSTRACT

A speech recognition apparatus generates a feature vector series corresponding to a speech signal, and recognizes a phoneme series corresponding to the feature vector series using sounds corresponding to phonemes and a phoneme language model. In addition, the speech recognition apparatus recognizes vocabulary that corresponds to the recognized phoneme series. At this time, the phoneme language model represents connection relationships between the phonemes, and is modeled according to time-variant characteristics of the phonemes.

15 Claims, 10 Drawing Sheets

HUMAN SPEECH RECOGNITION APPARATUS AND METHOD

CROSS-REFERENCE TO RELATED APPLICATION

This application claims priority to and the benefit of Korean Patent Application No. 10-2007-0130950 filed in the Korean Intellectual Property Office on Dec. 14, 2007, the entire contents of which are incorporated herein by reference.

BACKGROUND OF THE INVENTION (a) Field of the Invention

The present invention relates to a speech recognition apparatus and method. Particularly, the present invention relates to speech recognition using an HSR (human speech recognition) method.

The present invention is supported by the IT R&D program of MIC/IITA [2006-S-036-02, Development of large vocabulary/interactive distributed/embedded VUI for new growth engine industries].

(b) Description of the Related Art

Speech recognition is a technology used for a computer to align acoustic speech signals as text. That is, the speech recognition means that a speech signal obtained through a microphone or a telephone is converted into a word, a set of words, or a sentence. The resulting value obtained through the speech recognition may be used in an application field, such as for a command, control, data input, or document preparation with respect to a machine, and as an input value at the time of a language process in a field for speech understanding.

Various research has been performed on a method of making a speech recognition result substantially the same as an actually recognized word at the time of speech recognition, and a method of improving a speech recognition speed to enable speech recognition in real time.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a speech recognition method and apparatus, having advantages of improving speech recognition performance and speed as compared with those in an existing HSR (human speech recognition) method.

An exemplary embodiment of the present invention provides a speech recognition method that recognizes vocabulary from a speech signal. The speech recognition method includes generating a feature vector series that corresponds to the speech signal; recognizing a phoneme series corresponding to the feature vector series using a phoneme language model, which indicates connection relationships between phonemes and is modeled in consideration of a location where each of the phonemes is disposed in arbitrary vocabulary; and recognizing vocabulary that corresponds to the phoneme series.

The phoneme language model may use probability in the case in which one of a plurality of phonemes recognized at an arbitrary time is recognized in a state where previous (n−1) phonemes are recognized, with respect to each of the plurality of phonemes.

The recognition of the phoneme series may include recognizing the phoneme series using a phoneme condition, which is the probability in the case of observing a feature vector series derived from each of the plurality of phonemes. The recognition of the phoneme series may further include recognizing a phoneme series having the maximum posterior probability with respect to the feature vector series on the basis of the phoneme condition and the phoneme language model.

The recognizing of the vocabulary may include searching a comparison vocabulary having the maximum posterior probability with respect to the phoneme series on the basis of a vocabulary condition indicating a frequency of the arbitrary vocabulary, a comparison phoneme series obtained by subjecting the arbitrary vocabulary to pronunciation conversion, and an edition distance. The recognizing of the vocabulary may further include recognizing the edition distance in a search space by each of phonemes of the comparison phoneme series and each of phonemes of the phoneme series. The recognizing of the vocabulary includes dividing the comparison phoneme series into a plurality of continuous connection phonemes; dividing the phoneme series into a plurality of continuous connection phonemes; and recognizing the edition distance in a search space by each of the connection phonemes of the comparison phoneme series and each of the connection phonemes of the phoneme series. The plurality of connection phonemes may include at least one vowel.

Another embodiment of the present invention provides a speech recognition apparatus that recognizes vocabulary from a speech signal. The speech recognition apparatus includes a feature vector series generator that generates a feature vector series corresponding to the speech signal; a phoneme recognition unit that derives a phoneme series corresponding to the feature vector series using a phoneme language model, which indicates connection relationships between phonemes and is modeled in consideration of a location where each of the phonemes is disposed in arbitrary vocabulary; and a vocabulary recognition unit that derives vocabulary that corresponds to the phoneme series.

The phoneme language model may use probability in the case in which one of a plurality of phonemes recognized at an arbitrary time is recognized in a state where previous (n−1) phonemes are recognized, with respect to each of the plurality of phonemes.

The phoneme recognition unit may recognize a phoneme series having the maximum posterior probability with respect to the feature vector series on the basis of the probability in the case of observing an arbitrary feature vector series from each of the plurality of phonemes and the phoneme language model.

The vocabulary recognition unit may derive a vocabulary having the maximum posterior probability with respect to the phoneme series on the basis of a vocabulary condition indicating a frequency of the arbitrary vocabulary, a comparison phoneme series obtained by subjecting the arbitrary vocabulary to pronunciation conversion, and the edition distance of the comparison phoneme series and the phoneme series. The vocabulary recognition unit may recognize the edition distance in a search space by each of phonemes of the comparison phoneme series and each of phonemes of the phoneme series.

The vocabulary recognition unit may recognize the edition distance in a search space by each of a plurality of connection phonemes obtained by dividing the comparison phone series, and each of a plurality of connection phonemes obtained by dividing the phoneme series. The plurality of connection phonemes may include at least one vowel.

According to the present invention, since phonemes are decoded using a phoneme language model that is reliably modeled, matching with an actual area can be improved. Further, since vocabulary is decoded in a syllable unit, it is possible to improve the speech recognition speed.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "section", "-er (-or)", or "module" used herein mean a unit that processes at least one function or operation. This can be implemented by hardware, software, or a combination thereof.

Examples of a technology for recognizing speech using a machine include an ASR (automatic speech recognition) method and an HSR (human speech recognition) method. The present invention relates to a method of improving recognition performance and speed in speech recognition using the HSR method.

Also, in the following embodiments of the present invention, a speech recognition method that recognizes vocabulary from a speech signal is provided. The speech recognition method is composed of three computational modules. The first module converts an input speech signal into a feature vector sequence which is suitable for speech recognition, the second module plays a role to generate a phoneme sequence from the feature vector sequence as accurately as possible. There may be phoneme errors such as phoneme substitutions, insertions and deletions due to the performance limitations of the second module. Finally, the third module results an optimal recognition a word or word sequence which is recovered from the error-prone phoneme sequence.

The second module, phoneme recognition, is implemented by using conventional hidden Markov model (HMM)-based automatic speech recognition (ASR) system, where phone language model is used to generate as accurate phoneme sequence as possible. In order to improve the phoneme recognition accuracy, in the following embodiments of the present invention, a time-varying phone language model in which conditional probability between phoneme sequences varies depending on the position of phoneme in a word instead of the conventional time-invariant phone language model is provided.

Because there are practical limitations in HMM-based ASR system, the phoneme result may contain errors such as phoneme substitutions, deletions and insertions. The role of the third module is to recover such errors and find a optimal word or word sequence based on minimum edit distance approach. In general, edit distance is measured phoneme by phoneme. However, in the following embodiments of the present invention, edit distance between arbitrarily partitioned phoneme sequences for fast comparison is proposed.

Hereinafter, a speech recognition apparatus and method according to exemplary embodiments of the present invention will be described in detail with reference to the accompanying drawings.

Figure 1:
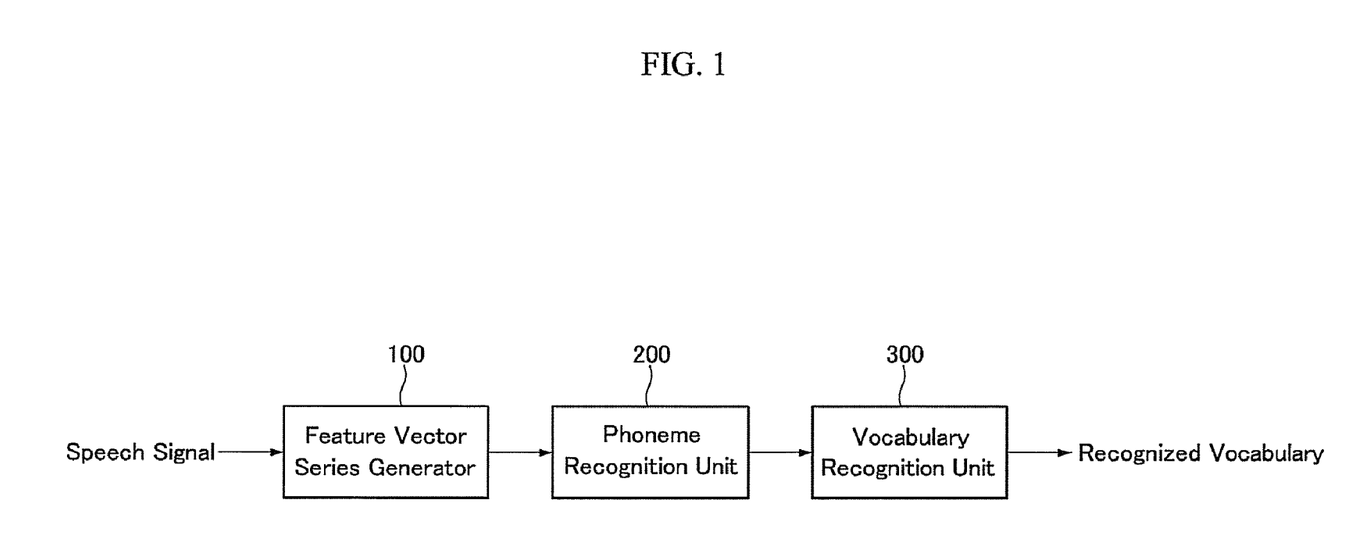
FIG. 1 is a block diagram illustrating a speech recognition apparatus according to an exemplary embodiment of the present invention.

FIG. 1 is a block diagram illustrating a speech recognition apparatus according to an exemplary embodiment of the present invention.

As shown in FIG. 1, a speech recognition apparatus according to an exemplary embodiment of the present invention includes a feature vector series generator 100, a phoneme recognition unit 200, and a vocabulary recognition unit 300.

Figure 2:
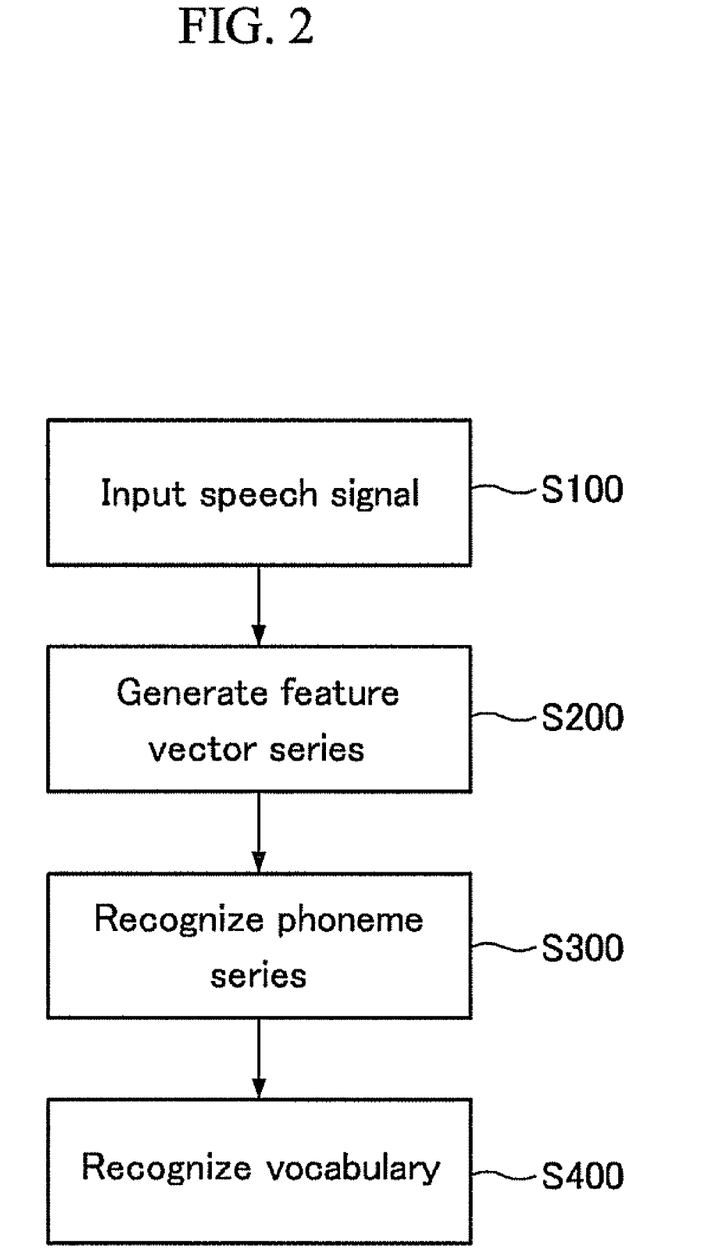
FIG. 2 is a flowchart illustrating an operation sequence of a speech recognition method according to an exemplary embodiment of the present invention.

FIG. 2 is a flowchart illustrating the operation sequence of a phoneme recognition apparatus according to an exemplary embodiment of the present invention.

As shown in FIG. 2, the feature vector series generator 100 receives a speech signal (Step S100), converts the speech signal in the time domain into a feature vector sequence which is suitable from the perspective of speech recognition.

The phoneme recognition unit 200 aims at producing a phoneme series corresponding to a feature vector series (Step S300) based on maximum a posterior criterion as specified in Equation 1.

$$P^* = \underset{P}{\mathrm{argmax}} Pr(X \mid P) \qquad \text{(Equation 1)}$$
$$= \underset{P}{\mathrm{argmax}} \frac{Pr(X \mid P)Pr(P)}{Pr(X)}$$
$$\approx \underset{P}{\mathrm{argmax}} Pr(X \mid P)Pr(P)$$

In Equation 1, P denotes a phoneme sequence, X is a feature vector sequence, Pr(X|P) is a probability of a feature vector sequence X for a phoneme series P, and Pr(P) is a prior probability for a phoneme sequence P. In general, Pr(X|P) is called acoustic model and Pr(X) as language model.

In the exemplary embodiment of the present invention Equation 1 is implemented by a conventional hidden Markov model (HMM)-based speech recognition framework, where Pr(X|P) is modeled with hidden Markov models, prior probability Pr(P) is approximated by phone n-gram and argmax{ } operation is implemented with Viterbi decoding algorithm. Among them the exemplary embodiment of the present invention is related to improve the performance of the conventional phone n-gram. First, the conventional phone n-gram is briefly reviewed and then the proposed method is explained in detail.

For a given phoneme sequence P=$p_1, p_2 \ldots, p_t$, the priori probability of P is given as follows:

$$Pr(p_1, \ldots, p_t) = Pr(p_t|p_{t-1},p_{t-2}, \ldots, p_1)Pr(p_{t-1}|p_{t-2}, \ldots, p_1) \ldots Pr(p_1) \quad \text{(Equation 2)}$$

However, it is impossible to estimate exact probability of Equation 2 due to shortage of training corpus in real world. Therefore, so-called, n-gram language model is used as an approximation for Equation 2, which makes the assumption that phoneme histories more than n−1 phonemes before the current phoneme do not affect the probability:

$$Pr(p_1, \ldots, p_t) \approx \prod_{i=1}^{t} Pr(p_i|p_{i-1}, \ldots, p_{i-(n-1)}) \quad \text{(Equation 3)}$$

Figure 3:
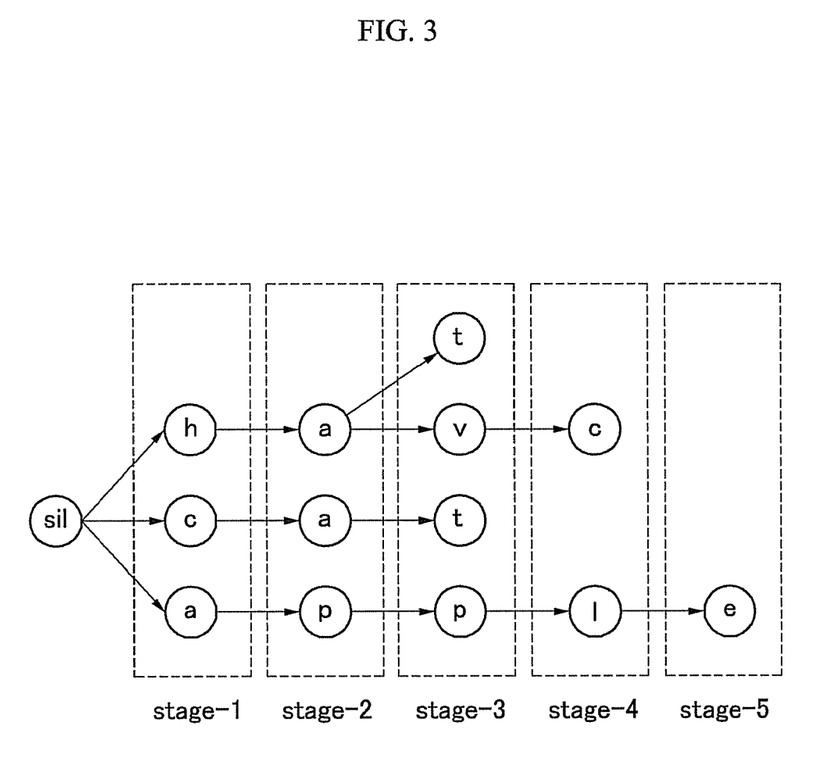
FIG. 3 graphically shows the idea of the position dependent phone 2-gram in an exemplary embodiment of the present invention.

The performance of phoneme recognition unit 200 highly depends on the degree of modeling accuracy of the two probabilistic models, acoustic model and phone n-gram. So, in the exemplary embodiment of the present invention, a more sophisticated phone language model is proposed, and it is called as position dependent phone n-gram. In the position dependent phone n-gram, phone n-gram is conditioned with location. FIG. 3 graphically shows the idea of the position dependent phone 2-gram.

Assuming that a lexicon is comprised of 4 words, "hat", "have", "cat" and "apple", and it is represented in a lexical tree as shown in FIG. 3, there are 3 possible phone transitions (or 2-gram), (h, a), (c, a), and (a, p), when making phoneme transitions from stage-1 to stage-2 and there are 3 phone transitions, (a, t), (a, v), (p, p) when making phoneme transition from stage-2 to stage-3. Like this, there are different phone transitions including different values depending on from where phone is making transitions.

Figure 4:
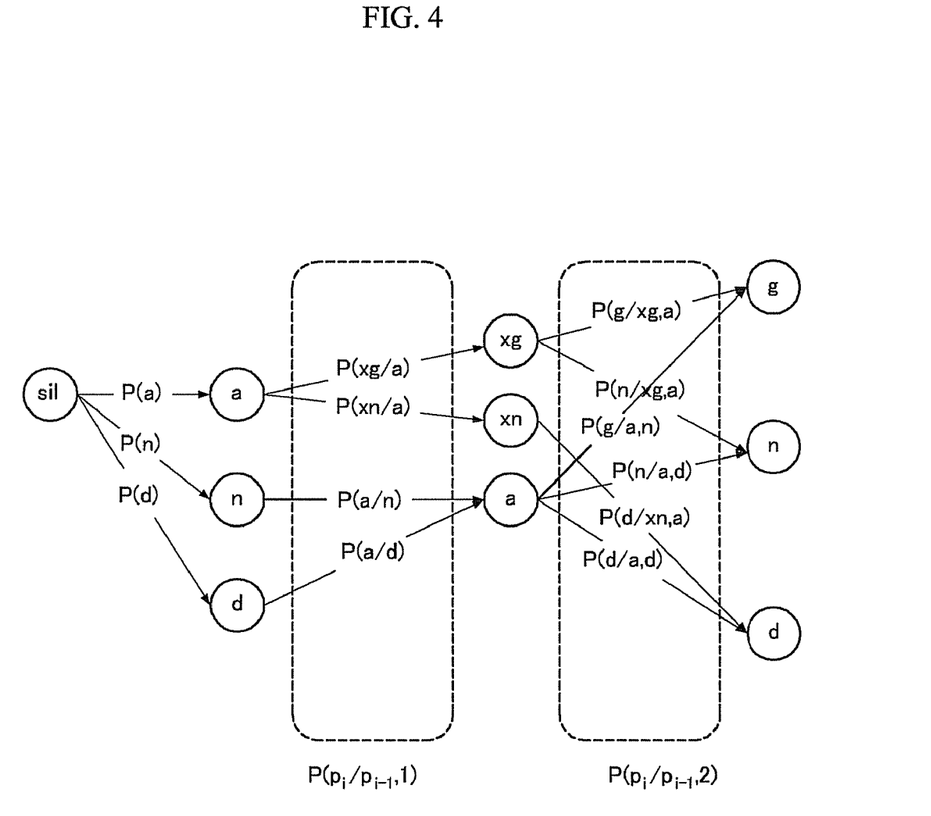
FIG. 4 illustrates a more detailed example of position dependent phone n-gram in an exemplary embodiment of the present invention.

FIG. 4 illustrates a more detailed example of position dependent phone n-gram. The phoneme transition probabilities between a phoneme "sil" and the first phonemes "a", "n", and "d" are generated as Pr(a|sil), Pr(n|sil), and Pr(d|sil), respectively. The phoneme transition probabilities between the first phonemes "a", "n", and "d" and the second phonemes "xg", "xn", and a are generated as Pr(xg|a), Pr(xn|a), Pr(a|n), and Pr(a|d), respectively. The phoneme transition probabilities between the second phonemes "xg", "xn", and a and the third phonemes "g", "n", and "d" are generated as Pr(g|xg, a), Pr(n|xn, a), Pr(g|a, n), Pr(n|a, d), Pr(d|xn, d), and Pr(d|a, d), respectively. As such, the same phoneme transition probability may be represented as a different value according to a location of the corresponding phoneme in the phoneme series. Therefore, according to the exemplary embodiment of the present invention, a phoneme language model is modeled differently according to a variable of the phoneme with respect to time. In other words, Equation 3 can be approximated as represented by Equation 4.

$$Pr(P) = Pr(p_t | p_{t-1}, p_{t-2}, \ldots, p_1) \quad \text{(Equation 4)}$$

$$Pr(p_{t-1} | p_{t-2}, \ldots, p_1) \ldots Pr(p_1)$$

$$= \prod_{i=1}^{t} Pr(p_i | p_{i-1}, \ldots, p_{i-(n-1)}, p_1^{i-n})$$

$$= \prod_{i=1}^{t} Pr(p_i | p_{i-1}, \ldots, p_{i-(n-1)}, i-n)$$

Here, $p_1^{i-n}$ is phone histories. In the conventional phone n-gram specified in Equation 3, it is neglected but we keep the i-n variable to reflect position dependency on approximating phone n-gram.

In addition, the phoneme recognition unit 200 recognizes a phoneme series using a proposed phone n-gram, which is modeled in consideration of a variable (hereinafter, referred to as "positional variable") indicating a location of the corresponding phoneme in arbitrary vocabulary.

Figure 5:
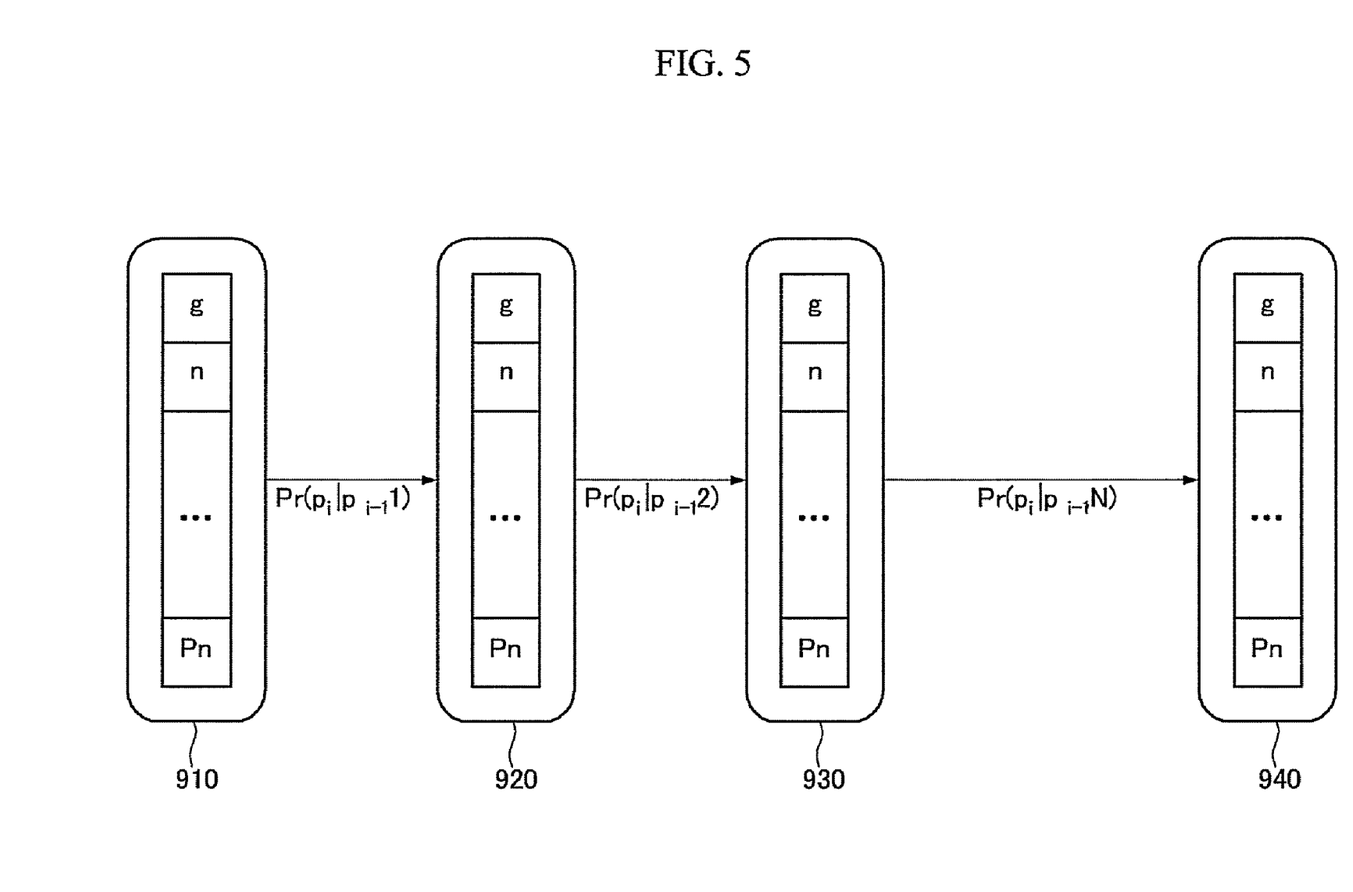
FIG. 5 is a diagram illustrating how the phoneme recognition unit incorporates the position dependent phone n-gram into decoding process, where n is 2.

FIG. 5 is a diagram illustrating how the phoneme recognition unit 200 incorporates the position dependent phone n-gram into decoding process, where n is 2.

Assuming that a speech signal corresponding to a word composed of several phonemes is given, the phoneme recognition unit 200 generates a first phoneme result without phone 2-gram. However, once a first phoneme is recognized, the phoneme recognition unit 200 applies phone 2-gram (Pr(p$_i$|p$_{i-1}$)) where 1 indicates the phone 2-gram is suitable for being used to phoneme recognition when making transition from a first phoneme to a second one. If a second phoneme result is generated, the phoneme recognition 200 applies different phone 2-gram, (Pr(p$_i$|p$_{i-1}$,2)) for recognizing a third phoneme result. In the same method, in a stage where N phonemes are already detected, the phoneme recognition unit 200 detects an N-th phoneme located in the phoneme series by applying an n-gram (Pr(p$_i$|p$_{i-1}$,N)) 940 to Equation 3.

As such, according to the exemplary embodiment of the present invention, the phoneme series is recognized using a phoneme language model having time-variant characteristics modeled in consideration of a positional variation (i-n). Therefore, when the phoneme recognition unit 200 recognizes the phoneme series, it is possible to reflect the phoneme transition probability that varies according to the location of the corresponding phoneme in the arbitrary vocabulary. Accordingly, since it is possible to accurately recognize the phoneme series, the speech recognition performance can be improved.

As shown in FIG. 2, the vocabulary recognition unit 300 aims at generating a word sequence from an error-prone phoneme sequence (Step S400), which satisfies the following maximum a posterior probability criterion:

$$W^* = \underset{W}{\operatorname{argmax}} Pr(W/P^*) \quad \text{(Equation 5)}$$

In Equation 5, P* is an error-prone phoneme sequence as a result of the phoneme recognition unit 200 and W is a target word. Because it is difficult to estimate the probability in real world, the following approximated way is commonly used.

$$W^* \approx \underset{W}{\operatorname{argmax}} Pr(P^*/C)P(C/W)P(W) \quad \text{(Equation 6)}$$

In Equation 6, C denotes a correct phoneme sequence corresponding to a target word W, which is obtained through pronunciation rules or pronunciation dictionaries. $Pr(P^*|C)$ indicates the probability (hereinafter referred to as "probabilistic edit distance") that produces an error-phoneme sequence $P^*$ from a correct phoneme sequence C, $P(C|W)$ is a pronunciation model which represents a probability that a phoneme sequence C is generated from a word W, and $P(W)$ is a language model that the probability of word or word sequence W being occurred. Among the probabilities, the conditional probability $Pr(P^*|C)$ is defined as follows:

$$Pr(P^*/C) = Pr(p_1^* p_2^* \ldots p_M^* / c_1 c_2 \ldots c_N) \quad \text{(Equation 7)}$$

However, in practice, on the assumption that errors between the phonemes independently occur, Equation 7 can be approximated as represented by Equation 7 given below.

$$Pr(P^*/C) \approx \prod_{i=1}^{N} Pr(p_i^*/c_i) \quad \text{(Equation 8)}$$

As represented by Equation 8, the conditional probability $Pr(P^*|C)$ can be represented by a multiplication of individual probabilities in the case where the phoneme $c_i$ of the phoneme series C is recognized as the phoneme $(p^*_i)$ of the phoneme series $P^*$.

In implementing the Equation 6 to find an optimal phoneme path and its probability, dynamic programming scheme, called probabilistic edit distance, is used as follows:

$$Q(x, y) = \min \begin{cases} Q(x-1, y-1) & + C(c_x, t_y) \\ Q(x-1, y) & + C(c_x, \varepsilon) \\ Q(x, y-1) & + C(\varepsilon, t_y) \end{cases} \quad \text{(Equation 9)}$$

In Equation 9, $Q(x,y)$ indicates minimum accumulated distance, and $C(c_x,t_y)$ indicates a cost function for the case where a phoneme $c_x$ occurs an alternative error as a phoneme $t_y$. In addition, $C(c_x,\varepsilon)$ indicates a cost function for the case where a deletion error occurs for the phoneme $c_x$, and $C(\varepsilon,t_y)$ indicates a cost function for the case where an insertion error of the phoneme $t_y$ occurs.

The cost function for each of the alternative error, the deletion error, and the insertion error as the error probability between each phoneme of the phoneme series $P^*$ and each phoneme of the phoneme series C can be represented by Equation 9 given below.

$$C(c_x, t_y) = -\log Pr(t_y | c_x)$$

$$C(c_x, \varepsilon) = -\log Pr(\varepsilon | c_x)$$

$$C(\varepsilon, t_y) = -\log Pr(t_y | \varepsilon) \quad \text{(Equation 10)}$$

As represented by Equation 10, each cost function can be represented as a negative logarithmic function for $Pr(p^*_i|c_i)$.

In the exemplary embodiment of the present invention, another approximation of $Pr(P^*|C)$ instead of Equation 8 to improve the recognition speed is proposed. Recognition speed relates with the size of search space composed by two phoneme sequences, $P^*$ and C. The smaller search space is, the faster recognition speed is. Therefore, an example for size of a search space when a conventional method is used is first provided.

Figure 6:
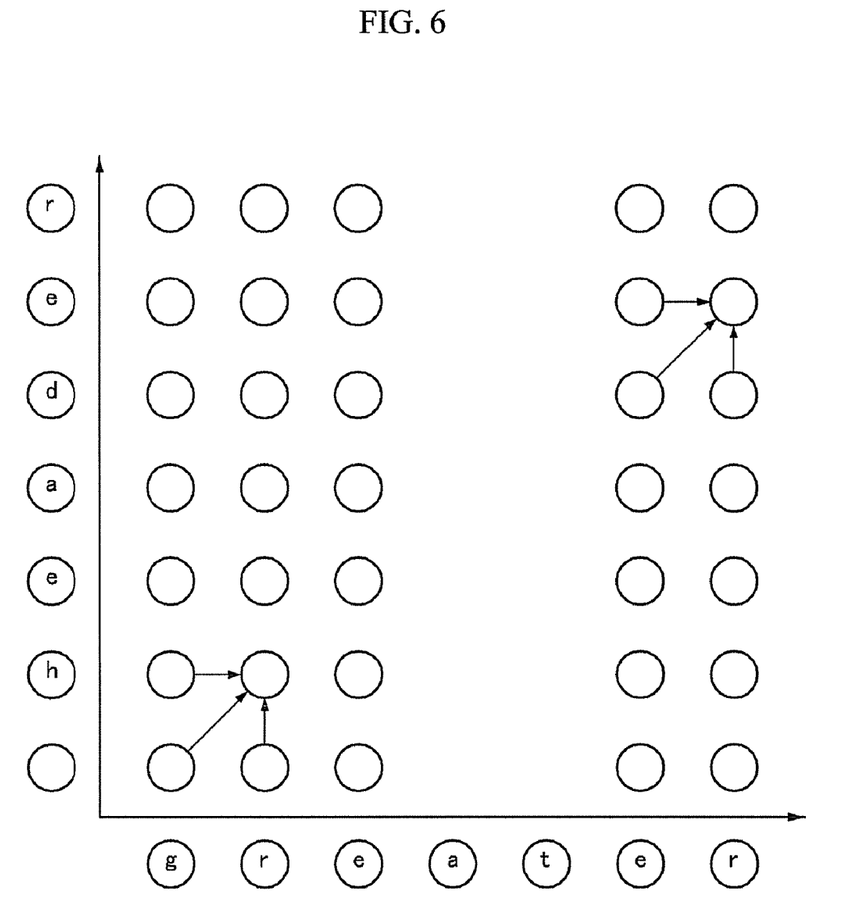
FIG. 6 is a diagram illustrating a search space according to a first exemplary embodiment of the present invention.

FIG. 6 is a diagram illustrating a search space according to a first exemplary embodiment of the present invention.

FIG. 6 exemplifies the case where the phoneme recognition unit 200 outputs the phoneme series ($P^*$="header") including an error with respect to a speech signal of the phoneme series (C="greater").

According to the first exemplary embodiment, the search space is formed by two phoneme strings, $P^*$ and C.

Because Equation 8 is derived from the assumption that phoneme errors occur independently, basic search unit is defined by phoneme as shown in FIG. 3. The search space is formed by 48 local nodes composed of multiplication of 7 phonemes of $P^*$ (NULL, h, e, a, d, e, r) by 7 phonemes of C (g, r, e, a, t, e, r).

Figure 7:
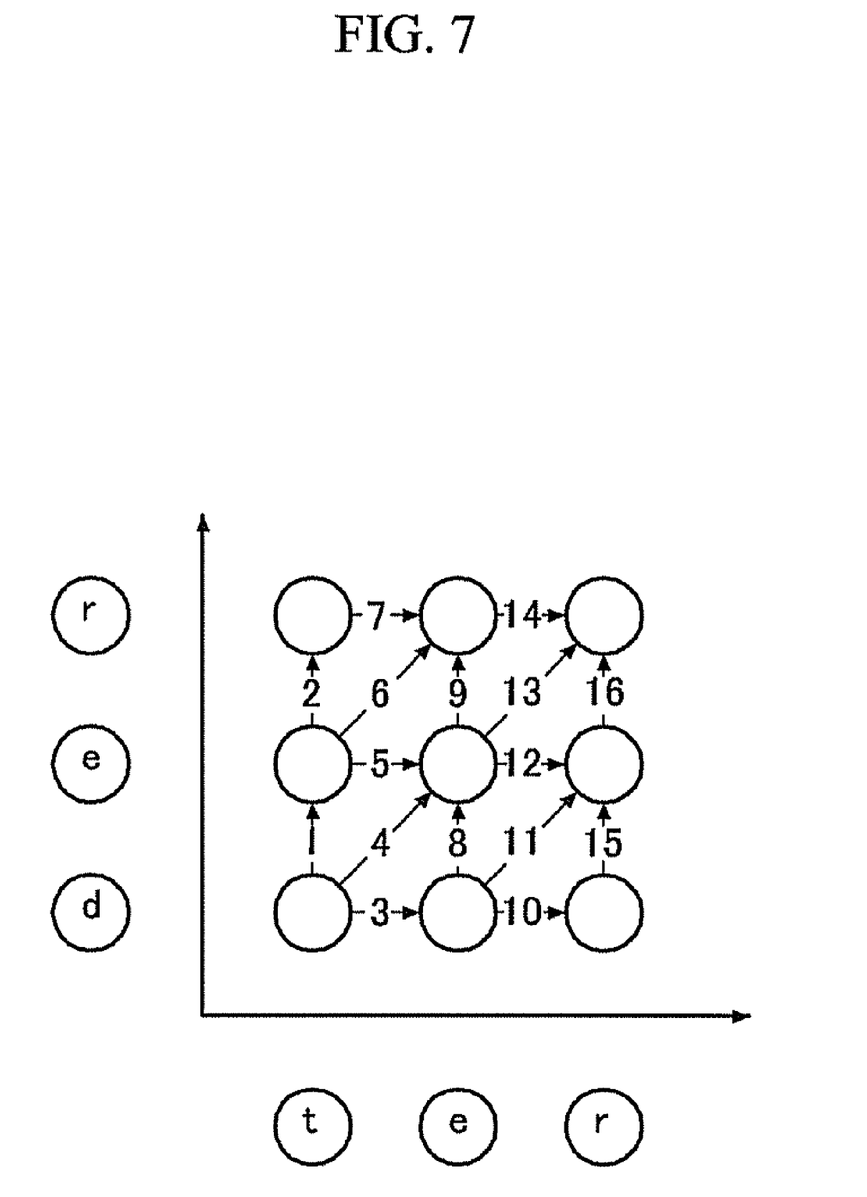
FIG. 7 is a diagram illustrating partial search space according to a first exemplary embodiment of the present invention shown in FIG. 6.

In dynamic programming, each local node holds minimum accumulated distance. FIG. 7 is a diagram illustrating partial search space according to a first exemplary embodiment of the present invention shown in FIG. 6.

As shown in FIG. 7, there are 16 different local nodes in the partial search between the sub-string d, e, and r of the phoneme series $P^*$ and the sub-string t, e, and r of the phoneme series C. That is, the search node having the minimum accumulated distance is searched from the search nodes 1, 3, and 4 connected to the search point of the phonemes t and d. In addition, when the search node 4 has the minimum accumulated distance, the search node of the phoneme e and the phoneme e are selected through the search node 4. The search node having the minimum accumulated distance is searched from the search nodes 9, 12, and 13 connected to the search point of the phoneme e and the phoneme e.

Figure 8:
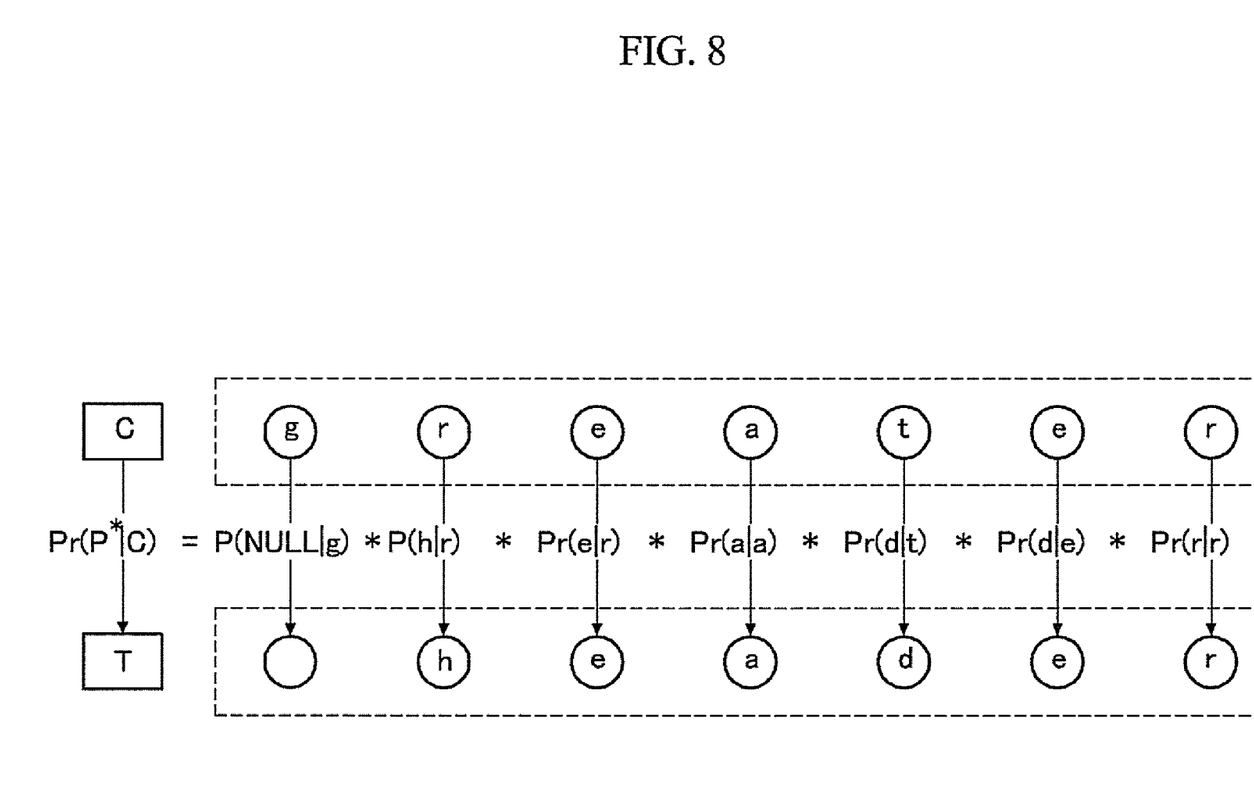
FIG. 8 is a diagram illustrating an edition distance in a search space according to a first exemplary embodiment of the present invention shown in FIG. 6.

FIG. 8 is a diagram illustrating an edition distance in a search space according to a first exemplary embodiment of the present invention shown in FIG. 6.

As shown in FIG. 8, the edition distance $Pr(P^*|C)$ can be calculated as $P(Null|g)*P(h|r)*P(e|e)*P(a|a)*P(d|t)*P(e|e)*P(r|r)$ using Equation 7.

In this case, individual combinations of the phonemes of the phoneme series $P^*$ and the phonemes of the phoneme series C to calculate the probability values correspond to search points that constitute the optimal search nodes.

As describe above, according to the first exemplary embodiment, in the search space that is configured in a phoneme unit by the phoneme series $P^*$ and the phoneme series C, the edition distance is calculated by calculating the probability values of the search points that achieve the minimum accumulated distance.

As shown by FIG. 8 and represented by Equation 9, in order to search the optimal search nodes, in the search space formed by the phoneme series C and the phoneme series $P^*$, three search nodes are generated to correspond to one search point, and the search node having the minimum accumulated distance is searched from the three search nodes. Therefore, a decrease in the search points in the search space can lead to a decrease in the frequency of calculation of the accumulated distance.

According to the second exemplary embodiment of the present invention, on the assumption that an error independently occurs in a connection phoneme unit composed of two continuous phonemes, the edition distance represented by Equation 7 can be approximated as represented by Equation 11 given below.

$$Pr(P^*/C) \approx \prod_{i=1}^{N/2} Pr(p_{i-1}^*, p_i^* / c_{i-1}, c_i) \quad \text{(Equation 11)}$$

In Equation 11, according to the second exemplary embodiment, the edition distance can be represented by a multiplication of probabilities in the case where the connection phonemes $c_{i-1}$ and $c_i$ of the phoneme series C are recognized as connection phonemes $p^*_{i-1}$ and $p^*_i$ of the phoneme series P*, respectively.

Alternatively, on the assumption that an error independently occurs in a connection phoneme unit composed of three continuous phonemes, the edition distance represented by Equation 7 can be approximated as represented by Equation 12 given below.

$$Pr(P^*/C) \approx \prod_{i=1}^{N/3} Pr(p^*_{i-2}, p^*_{i-1}, p^*_i / c_{i-2}, c_{i-1}, c_i) \quad \text{(Equation 12)}$$

As represented by Equation 12, according to the second exemplary embodiment, the edition distance can be represented by a multiplication of probabilities in the case where the connection phonemes $c_{i-2}$, $c_{i-1}$ and $c_i$ of the phoneme series C are recognized as connection phonemes $p^*_{i-2}$, $p^*_{i-1}$, and $p^*_i$ of the phoneme series P* respectively.

In the description below, it is assumed that the phoneme series P* and the phoneme series C each are divided in a connection phoneme unit composed of three phonemes. At this time, there may be null in the phonemes constituting the connection phonemes. The null phoneme is a virtual phoneme assumed as a phoneme that does not generate a sound, and is used to represent the addition and deletion error of phonemes.

According to the second exemplary embodiment, a search point is set in a connection phoneme unit including one or more phonemes in the search space formed by the phoneme series C and the phoneme series P to search the optimal search node.

Figure 9:
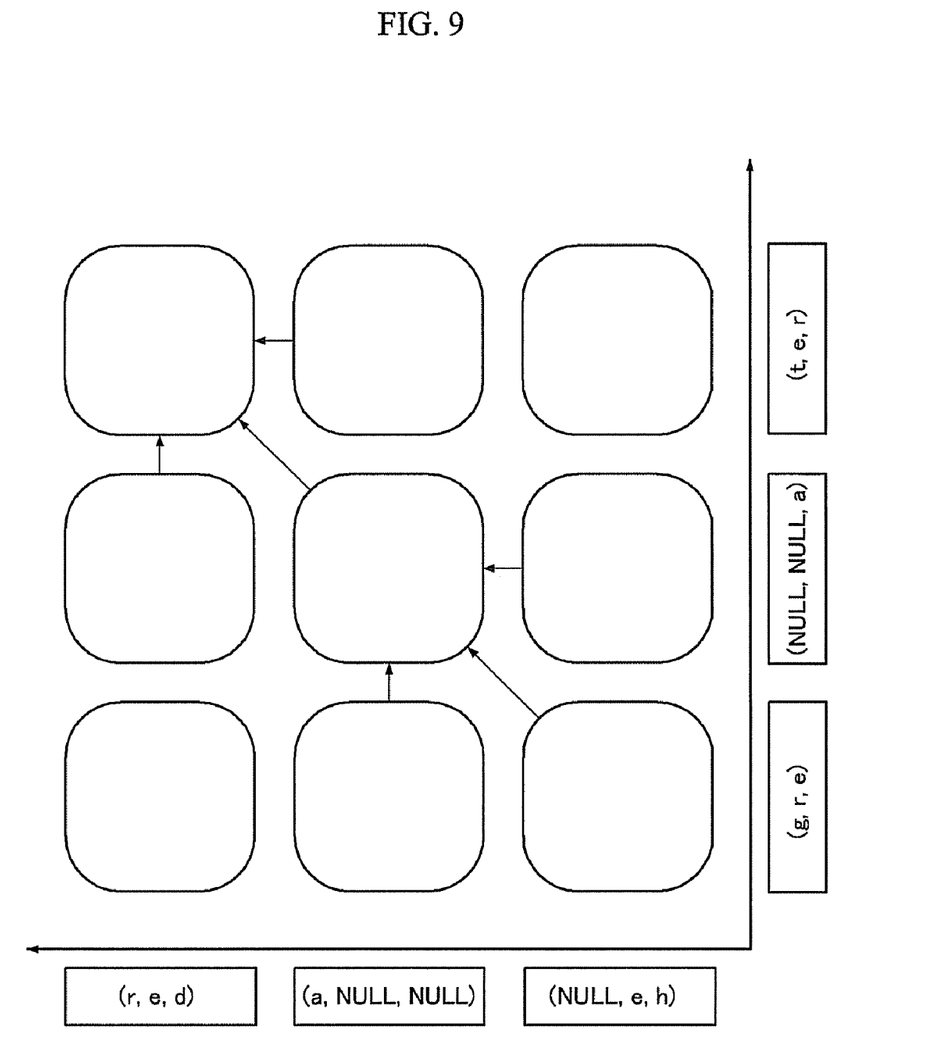
FIG. 9 is a diagram illustrating a search space according to a second exemplary embodiment of the present invention.

FIG. 9 is a diagram illustrating a search space according to a second exemplary embodiment of the present invention.

FIG. 9 exemplifies the case where the phoneme recognition unit 200 outputs a phoneme series (P*="header") including an error with respect to the speech signal of the phoneme series (C="greater"), similar to the case in FIG. 3.

The phoneme series (P*="header") may be divided into a connection phoneme, (h e NULL), a connection phoneme (NULL NULL a), and a connection phoneme (d e r), and the phoneme series (C="greater") may be divided into a connection phoneme (g r e), a connection phoneme (NULL NULL a), and a connection phoneme (t e r).

Therefore, as shown in FIG. 9, according to the second exemplary embodiment, the search space formed by the phoneme series C and the phoneme series P* is composed of search points in a connection phoneme unit, and includes 9 search points of 3×3.

Comparing FIGS. 6 and 9 with each other, the search space shown in FIG. 6 includes 42 search points, while the search space shown in FIG. 9 includes 9 search points. Thus, it can be confirmed that the search space shown in FIG. 9 is reduced to approximately ⅕ of the search space shown in FIG. 6.

Meanwhile, when using the search space in a connection phoneme unit according to the second exemplary embodiment, there is the possibility that the optimal search node cannot be searched, as compared with when using the search space according to the first exemplary embodiment.

Figure 10:
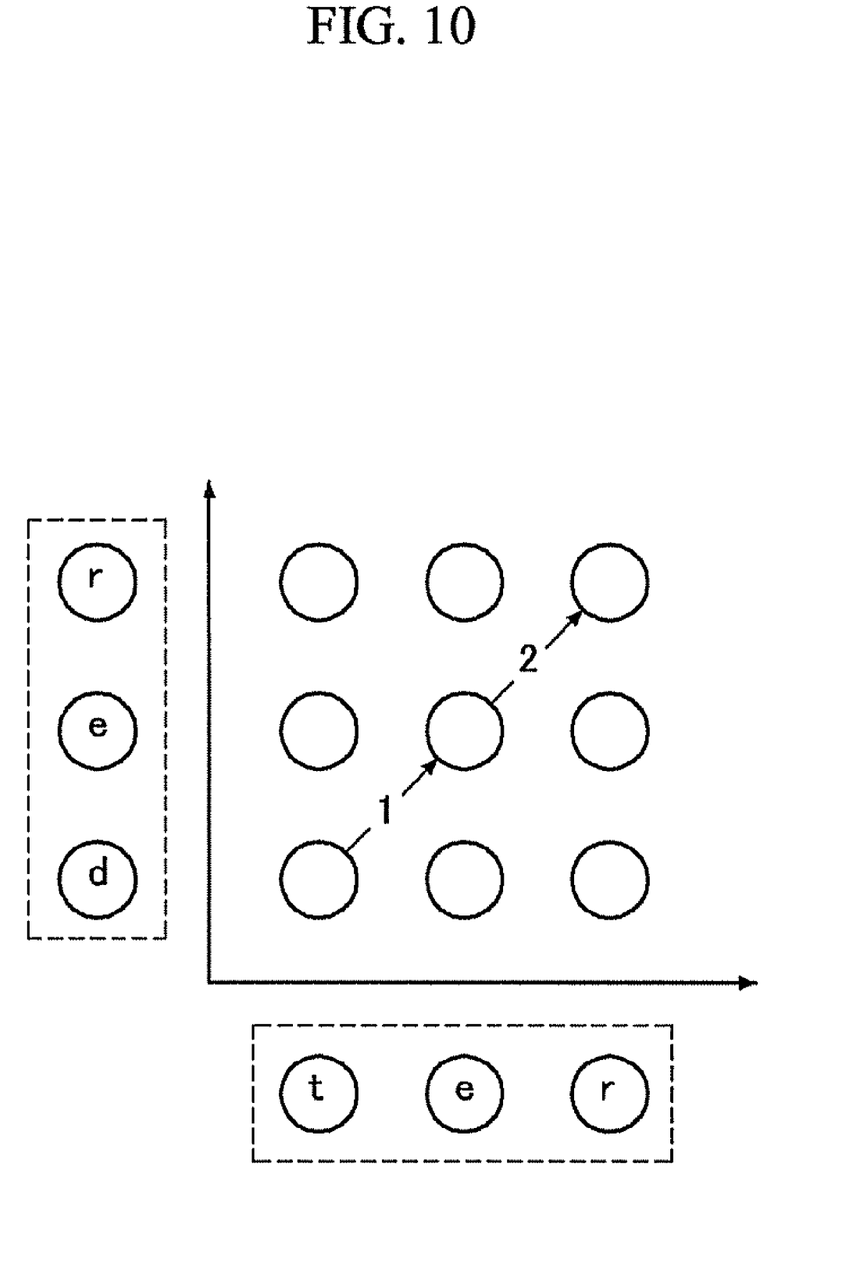
FIG. 10 is a diagram illustrating partial search nodes in a search space according to a second exemplary embodiment of the present invention shown in FIG. 9.

FIG. 10 is a diagram illustrating partial search nodes in a search space according to a second exemplary embodiment of the present invention shown in FIG. 9.

As shown in FIG. 10, two search nodes are generated by the search points by the connection phonemes (t e r) of the phoneme series C and the connection phonemes (d e r) of the phoneme series P*, and a search node having the minimum accumulated distance is searched from the two search nodes.

Meanwhile, referring to FIG. 7, the 16 different search nodes are generated by 9 search points by the phonemes t, e, and r of the phoneme series C and the phonemes d, e, and r of the phoneme series P*, and the optimal search node is searched from the 16 search nodes.

That is, according to the second exemplary embodiment, linear matching is performed between phonemes constituting the connection phonemes, and dynamic matching is performed between the connection phonemes. Meanwhile, according to the first exemplary embodiment, dynamic matching is performed in all cases between the phonemes. Therefore, according to the second exemplary embodiment, as compared with the first exemplary embodiment, the optimal edition distance may not be calculated, which deteriorates vocabulary recognition performance.

In order to prevent the vocabulary recognition performance from being deteriorated, according to the second exemplary embodiment, when dividing the phoneme series into the connection phonemes, a restriction is set using phonetic information.

That is, a word is formed by coupling phonemes, while a sound is spoken on the basis of a syllable. In this case, the syllable means a phoneme series where one vowel and consonants located before and after one vowel are continuous. That is, a speech signal is generated through speaking where syllable rules are reflected and two consonants located before and after one vowel are interlocked on the basis of one vowel.

According to the phonetic information, the phonemes that constitute the connection phonemes should include one vowel phoneme. That is, in Equation 12, at least one of phonemes $p^*_{i-2}$, $p^*_{i-1}$, and $p^*_i$, which constitute a connection phoneme of the phoneme series P*, needs to be a vowel, and at least one of phonemes $c_{i-2}$, $c_{i-1}$, and $c_i$, which constitute a connection phoneme of the phoneme series C needs to be a vowel. In Equation 11, like Equation 12, at least one of phonemes $p^*_{i-1}$ and $p^*_i$, which constitute a connection phoneme of the phoneme series P*, needs to be a vowel, and at least one of phonemes $c_{i-1}$ and $c_i$, which constitute a connection phoneme of the phoneme series C, needs to be a vowel.

In this way, in the vocabulary recognition process using the speech recognition, vowels indicating important information can be aligned, which prevents the vocabulary recognition performance from being deteriorated.

As such, according to the second exemplary embodiment of the present invention, since the search points in the search space are generated in a connection phoneme unit composed of two or more phonemes, it is possible to improve the vocabulary recognition speed. Further, since the connection phoneme should include a vowel, it is possible to prevent the vocabulary recognition performance from being deteriorated due to a decrease in the search points.

The exemplary embodiments of the present invention that have been described above may be implemented by not only a method and an apparatus but also by a program that is capable of realizing a function corresponding to the structure according to the exemplary embodiments of the present invention, and a recording medium having the program recorded therein. It can be understood by those skilled in the art that the implementation can be easily made from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A speech recognition method that recognizes vocabulary from a speech signal, the method comprising:
   generating a feature vector series that corresponds to the speech signal;
   recognizing, by a processor, a phoneme series corresponding to the feature vector series using a phoneme language model, which indicates connection relationships between phonemes and is modeled in consideration of a location where each of the phonemes is disposed in arbitrary vocabulary; and
   recognizing vocabulary that corresponds to the phoneme series.

2. The speech recognition method of claim 1, wherein the phoneme language model is the probability in the case in which one of a plurality of phonemes recognized at an arbitrary time is recognized in a state where previous (n−1) phonemes are recognized, with respect to each of the plurality of phonemes.

3. The speech recognition method of claim 2, wherein the recognition of the phoneme series includes recognizing the phoneme series using a phoneme condition, which is the probability in the case of observing a feature vector series derived from each of the plurality of phonemes.

4. The speech recognition method of claim 3, wherein the recognition of the phoneme series further includes recognizing a phoneme series having the maximum posterior probability with respect to the feature vector series on the basis of the phoneme condition and the phoneme language model.

5. The speech recognition method of claim 2, wherein the recognizing of the vocabulary includes searching a comparison vocabulary having the maximum posterior probability with respect to the phoneme series on the basis of a vocabulary condition indicating a frequency of the arbitrary vocabulary, a comparison phoneme series obtained by subjecting the arbitrary vocabulary to pronunciation conversion, and an edition distance.

6. A speech recognition method that recognizes vocabulary from a speech signal, the method comprising:
   generating a feature vector series that corresponds to the speech signal;
   recognizing, by a processor, a phoneme series corresponding to the feature vector series using a phoneme language model, which indicates connection relationships between phonemes and is modeled in consideration of a location where each of the phonemes is disposed in arbitrary vocabulary; and
   recognizing vocabulary that corresponds to the phoneme series,
   wherein the phoneme language model is the probability in the case in which one of a plurality of phonemes recognized at an arbitrary time is recognized in a state where previous (n−1) phonemes are recognized, with respect to each of the plurality of phonemes,
   wherein the recognizing of the vocabulary includes searching a comparison vocabulary having the maximum posterior probability with respect to the phoneme series on the basis of a vocabulary condition indicating a frequency of the arbitrary vocabulary, a comparison phoneme series obtained by subjecting the arbitrary vocabulary to pronunciation conversion, and an edition distance,
   wherein the recognizing of the vocabulary further includes recognizing the edition distance in a search space by each of phonemes of the comparison phoneme series and each of phonemes of the phoneme series.

7. The speech recognition method of claim 6, wherein the recognizing of the vocabulary includes:
   dividing the comparison phoneme series into a plurality of continuous connection phonemes;
   dividing the phoneme series into a plurality of continuous connection phonemes; and
   recognizing the edition distance in a search space by each of the connection phonemes of the comparison phoneme series and each of the connection phonemes of the phoneme series.

8. The speech recognition method of claim 7, wherein the plurality of connection phonemes include at least one vowel.

9. A speech recognition apparatus that recognizes vocabulary from a speech signal, the apparatus comprising:
   a feature vector series generator that generates a feature vector series corresponding to the speech signal;
   a phoneme recognition unit of a processor that derives a phoneme series corresponding to the feature vector series using a phoneme language model, which indicates connection relationships between phonemes and is modeled in consideration of a location where each of the phonemes is disposed in arbitrary vocabulary; and
   a vocabulary recognition unit that derives vocabulary that corresponds to the phoneme series.

10. The speech recognition apparatus of claim 9, wherein the phoneme language model is the probability in a case in which one of a plurality of phonemes recognized at an arbitrary time is recognized in a state where previous (n−1) phonemes are recognized, with respect to each of the plurality of phonemes.

11. The speech recognition apparatus of claim 10, wherein the phoneme recognition unit recognizes a phoneme series having the maximum posterior probability with respect to the feature vector series on the basis of the probability in the case of observing an arbitrary feature vector series from each of the plurality of phonemes and the phoneme language model.

12. A speech recognition apparatus that recognizes vocabulary from a speech signal, the apparatus comprising:
   a feature vector series generator that generates a feature vector series corresponding to the speech signal;
   a phoneme recognition unit of a processor that derives a phoneme series corresponding to the feature vector series using a phoneme language model, which indicates connection relationships between phonemes and is modeled in consideration of a location where each of the phonemes is disposed in arbitrary vocabulary; and
   a vocabulary recognition unit that derives vocabulary that corresponds to the phoneme series
   wherein the phoneme language model is the probability in a case in which one of a plurality of phonemes recognized at an arbitrary time is recognized in a state where previous (n−1) phonemes are recognized, with respect to each of the plurality of phonemes,
   wherein the vocabulary recognition unit derives vocabulary having the maximum posterior probability with respect to the phoneme series on the basis of a vocabulary condition indicating a frequency of the arbitrary vocabulary, a comparison phoneme series obtained by subjecting the arbitrary vocabulary to pronunciation conversion, and the edition distance of the comparison phoneme series and the phoneme series.

13. The speech recognition apparatus of claim 12, wherein the vocabulary recognition unit recognizes the edition distance in a search space by each of phonemes of the comparison phoneme series and each of phonemes of the phoneme series.

14. The speech recognition apparatus of claim 13, wherein the vocabulary recognition unit recognizes the edition distance in a search space by each of a plurality of connection phonemes obtained by dividing the comparison phone series, and each of a plurality of connection phonemes obtained by dividing the phoneme series.

15. The speech recognition apparatus of claim 14, wherein the plurality of connection phonemes include at least one vowel.

* * * * *